(12) United States Patent
Nurmi

(10) Patent No.: US 9,727,128 B2
(45) Date of Patent: Aug. 8, 2017

(54) METHODS, APPARATUSES, AND COMPUTER PROGRAM PRODUCTS FOR ENHANCING ACTIVATION OF AN AUGMENTED REALITY MODE

(75) Inventor: Mikko Antero Nurmi, Tampere (FI)

(73) Assignee: Nokia Technologies Oy, Espoo (FI)

( * ) Notice: Subject to any disclaimer, the term of this patent is extended or adjusted under 35 U.S.C. 154(b) by 305 days.

(21) Appl. No.: 12/874,840

(22) Filed: Sep. 2, 2010

(65) Prior Publication Data

US 2012/0058801 A1    Mar. 8, 2012

(51) Int. Cl.
G09G 5/00      (2006.01)
G06F 3/01      (2006.01)
G06T 19/00     (2011.01)

(52) U.S. Cl.
CPC ............ G06F 3/011 (2013.01); G06T 19/006 (2013.01)

(58) Field of Classification Search
CPC ...... G06F 3/04842; G06F 3/011; G06F 3/005; G06F 3/017; G06F 3/01; G06F 3/04815; G06F 17/3087; G06F 2221/2111; G06T 19/006
USPC ........................................................ 345/633
See application file for complete search history.

(56) References Cited

U.S. PATENT DOCUMENTS

| | | | |
|---|---|---|---|
| 5,850,212 A | 12/1998 | Nishibori | |
| 6,166,744 A * | 12/2000 | Jaszlics et al. | 345/629 |
| 6,359,603 B1 * | 3/2002 | Zwern | 345/8 |
| 7,720,436 B2 * | 5/2010 | Hamynen et al. | 455/13.1 |
| 8,363,113 B2 * | 1/2013 | Kim et al. | 348/207.1 |
| 2003/0151592 A1 * | 8/2003 | Ritter | 345/156 |
| 2004/0046711 A1 * | 3/2004 | Triebfuerst | 345/8 |
| 2005/0027705 A1 * | 2/2005 | Sadri et al. | 707/5 |
| 2007/0035562 A1 * | 2/2007 | Azuma et al. | 345/633 |
| 2009/0102859 A1 * | 4/2009 | Athsani et al. | 345/619 |
| 2009/0171748 A1 * | 7/2009 | Aven et al. | 705/10 |
| 2009/0319181 A1 * | 12/2009 | Khosravy et al. | 701/208 |

(Continued)

FOREIGN PATENT DOCUMENTS

| | | |
|---|---|---|
| EP | 1 406 163 A2 | 4/2004 |
| EP | 1 752 861 A1 | 2/2007 |

(Continued)

OTHER PUBLICATIONS

Gärdenfors, Dan, et al.; *Augmented reality for the masses*; [online]; [Retrieved on Feb. 10, 2010]; Retrieved from the Internet <URL: http://www.perey.com/MobileARSummit/TAT-Augmented-reality-for-the-masses.pdf>; 4 sheets.

(Continued)

*Primary Examiner* — M Good Johnson
(74) *Attorney, Agent, or Firm* — Alston & Bird LLP

(57) ABSTRACT

Methods, apparatuses, and computer program products are provided for enhancing activation of an augmented reality mode. A method may include detecting a predefined trigger for activating an augmented reality mode. The method may further include determining, responsive to the predefined trigger, at least a portion of content visibly displayed. The method may additionally include activating the augmented reality mode, wherein content displayed in the augmented reality mode is at least partially defined by the determined content. Corresponding apparatuses and computer program products are also provided.

20 Claims, 8 Drawing Sheets

(56) References Cited

U.S. PATENT DOCUMENTS

| | | |
|---|---|---|
| 2009/0322671 A1 | 12/2009 | Scott et al. |
| 2009/0327958 A1 | 12/2009 | Lung |
| 2010/0185674 A1* | 7/2010 | Jobs et al. .................... 707/781 |
| 2010/0208033 A1* | 8/2010 | Edge et al. .................... 348/46 |
| 2010/0222046 A1* | 9/2010 | Cumming .................... 455/418 |
| 2011/0098056 A1* | 4/2011 | Rhoads ................ G01C 21/20 455/456.1 |
| 2011/0161875 A1* | 6/2011 | Kankainen .................... 715/810 |
| 2011/0164163 A1* | 7/2011 | Bilbrey et al. ........... 348/333.01 |
| 2011/0231383 A1* | 9/2011 | Smyth .............. G06F 17/30522 707/707 |
| 2011/0279445 A1* | 11/2011 | Murphy et al. ............... 345/419 |
| 2012/0001939 A1* | 1/2012 | Sandberg .................... 345/633 |
| 2012/0019557 A1* | 1/2012 | Aronsson et al. ........... 345/633 |

FOREIGN PATENT DOCUMENTS

| | | |
|---|---|---|
| EP | 1 926 051 A2 | 5/2008 |
| WO | WO 01/89246 A1 | 11/2001 |
| WO | WO 03/098589 A1 | 11/2003 |
| WO | WO 2009/084840 A2 | 7/2009 |

OTHER PUBLICATIONS

*START Augmented Reality for Pervasive Computer*; [online]; [Retrieved on Jun. 30, 2010]; Retrieved from the Internet <URL: http://www.icg.tu-graz.ac.at/research/START/>; 1 sheet.

Lang, Tobias, et al.; *Massively Multiplayer Online Worlds as a Platform for Augmented Reality Experiences*; Presented May 12, 2008 in the Paper Sessions of IEEE Virtual Reality 2008; Reno, Nevada; pp. 67-70.

\* cited by examiner

METHODS, APPARATUSES, AND COMPUTER PROGRAM PRODUCTS FOR ENHANCING ACTIVATION OF AN AUGMENTED REALITY MODE

TECHNOLOGICAL FIELD

Example embodiments of the present invention relate generally to user interface technology and, more particularly, relate to methods, apparatuses, and computer program products for enhancing activation of an augmented reality mode.

BACKGROUND

The modern communications era has brought about a tremendous expansion of wireline and wireless networks. Wireless and mobile networking technologies have addressed related consumer demands, while providing more flexibility and immediacy of information transfer. Concurrent with the expansion of networking technologies, an expansion in computing power has resulted in development of affordable computing devices capable of taking advantage of services made possible by modern networking technologies. This expansion in computing power has led to a reduction in the size of computing devices and given rise to a new generation of mobile devices that are capable of performing functionality that only a few years ago required processing power that could be provided only by the most advanced desktop computers. Consequently, mobile computing devices having a small form factor have become ubiquitous and are used to access network applications and services by consumers of all socioeconomic backgrounds.

Some platform and application developers are leveraging the power of modern mobile computing devices and mobile networking technologies to provide a variety of services to mobile computing device users. One such example service is augmented reality. In this regard, mobile computing devices may, in some situations, enhance the interaction that users have with their environment. Augmented reality involves the merging of real and virtual worlds. In some cases, augmented reality involves mixing real world image data with virtual objects in order to produce environments and visualizations in which physical and digital objects co-exist and potentially also interact in real time.

When incorporating augmented reality into a particular application or scenario, a user may be enabled to capture a live image or utilize a captured real world image and then add information to the image. A very common example of augmented reality is experienced frequently when watching a sporting event on television with streaming or otherwise intermittently presented score or other status information being overlaid onto the video of the sporting action itself. Another example use of augmented reality is the provision of a virtual tour guide, which may provide additional information about an environment in which a user is located by adding virtual content about real world locations to images of those locations.

BRIEF SUMMARY

Methods, apparatuses, and computer program products are herein provided for enhancing activation of an augmented reality mode. Methods, apparatuses, and computer program products in accordance with various embodiments may provide several advantages to computing devices, content providers, and computing device users. Some example embodiments provide an augmented reality mode that is integrated (e.g., seamlessly integrated) into a standard user interface of a computing device. In this regard, some example embodiments provide for a seamless activation of an augmented reality mode from a general operating system and/or application graphical user interface of a computing device. In some example embodiments, integration is provided between a standard user interface and an augmented reality mode in that content displayed in the augmented reality mode is influenced at least in part by content displayed in the standard user interface when the augmented reality mode is activated.

In accordance with some example embodiments, a transition effect is provided between a standard user interface (e.g., an interface for an operating system or non-augmented reality application) and a user interface of the augmented reality mode to enhance a sense of seamless integration between the standard user interface and the augmented reality user interface. In some example embodiments, a transition effect is provided wherein a two-dimensional display view, such as may be presented in a standard user interface, is transitioned to a three-dimensional display view and the three-dimensional display view is transitioned to an augmented reality display view.

Some example embodiments may enable more rapid activation of augmented reality mode by determining when there is a likelihood of augmented reality mode being activated and pre-launching a viewfinder. Accordingly, when the augmented reality mode is activated, the viewfinder may have been pre-launched and a time required to launch the viewfinder may not delay functionality of the augmented reality mode.

In a first example embodiment, a method is provided, which comprises detecting a predefined trigger for activating an augmented reality mode. The method of this example embodiment further comprises determining, responsive to the predefined trigger, at least a portion of content visibly displayed. The method of this example embodiment additionally comprises activating the augmented reality mode, wherein content displayed in the augmented reality mode is at least partially defined by the determined content.

In another example embodiment, an apparatus comprising at least one processor and at least one memory storing computer program code is provided. The at least one memory and stored computer program code are configured, with the at least one processor, to cause the apparatus of this example embodiment to at least detect a predefined trigger for activating an augmented reality mode. The at least one memory and stored computer program code are configured, with the at least one processor, to further cause the apparatus of this example embodiment to determine, responsive to the predefined trigger, at least a portion of content visibly displayed. The at least one memory and stored computer program code are configured, with the at least one processor, to additionally cause the apparatus of this example embodiment to activate the augmented reality mode, wherein content displayed in the augmented reality mode is at least partially defined by the determined content.

In another example embodiment, a computer program product is provided. The computer program product of this example embodiment includes at least one computer-readable storage medium having computer-readable program instructions stored therein. The program instructions of this example embodiment comprise program instructions configured to detect a predefined trigger for activating an augmented reality mode. The program instructions of this example embodiment further comprise program instructions configured to determine, responsive to the predefined trigger, at least a portion of content visibly displayed. The program instructions of this example embodiment also comprise program instructions configured to activate the augmented reality mode, wherein content displayed in the augmented reality mode is at least partially defined by the determined content.

In another example embodiment, an apparatus is provided that comprises means for detecting a predefined trigger for activating an augmented reality mode. The apparatus of this example embodiment further comprises means for determining, responsive to the predefined trigger, at least a portion of content visibly displayed. The apparatus of this example embodiment additionally comprises means for activating the augmented reality mode, wherein content displayed in the augmented reality mode is at least partially defined by the determined content.

The above summary is provided merely for purposes of summarizing some example embodiments of the invention so as to provide a basic understanding of some aspects of the invention. Accordingly, it will be appreciated that the above described example embodiments are merely examples and should not be construed to narrow the scope or spirit of the invention in any way. It will be appreciated that the scope of the invention encompasses many potential embodiments, some of which will be further described below, in addition to those here summarized.

BRIEF DESCRIPTION OF THE DRAWING(S)

Having thus described embodiments of the invention in general terms, reference will now be made to the accompanying drawings, which are not necessarily drawn to scale, and wherein:

Figure 4A:
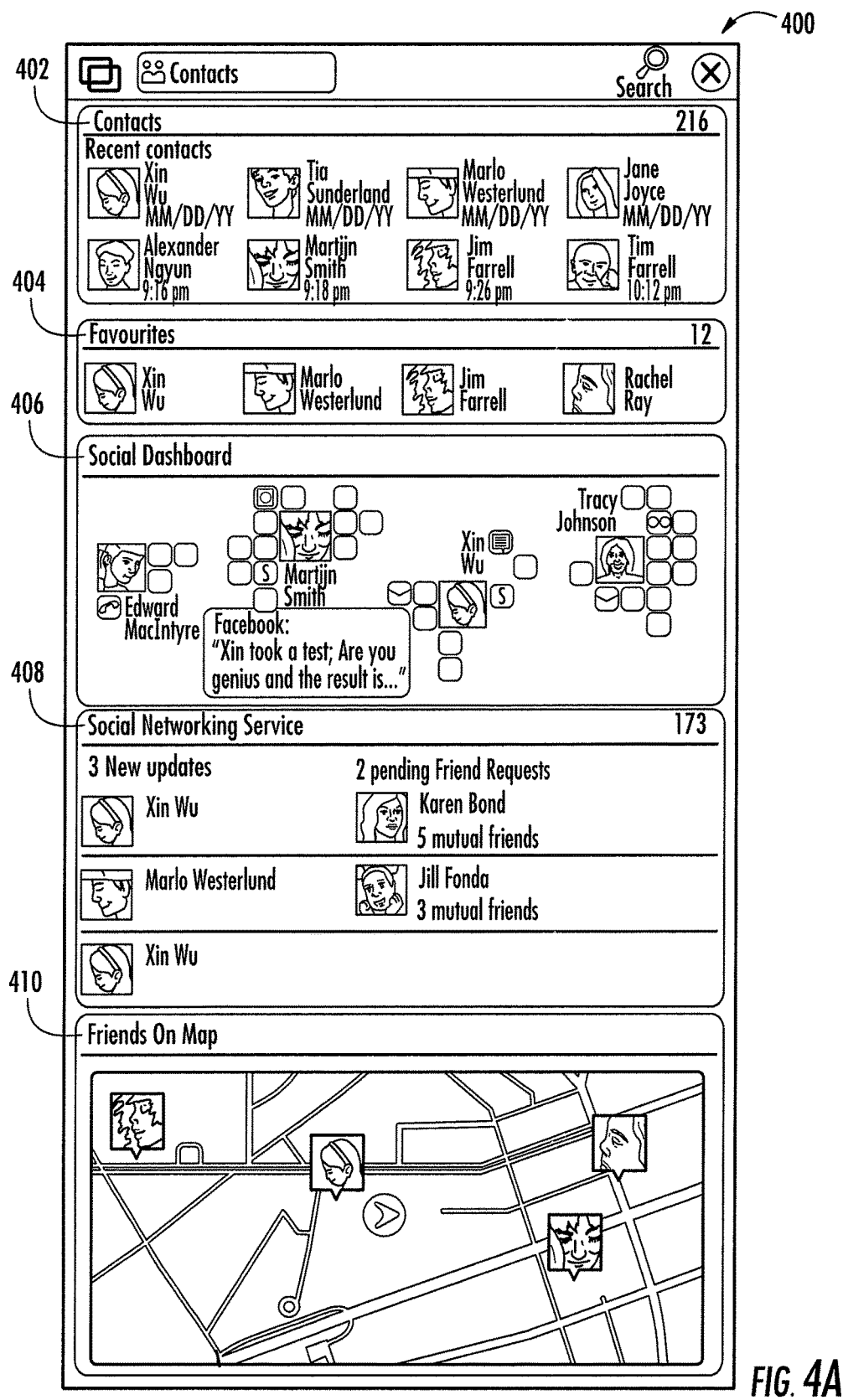
Figure 4B:
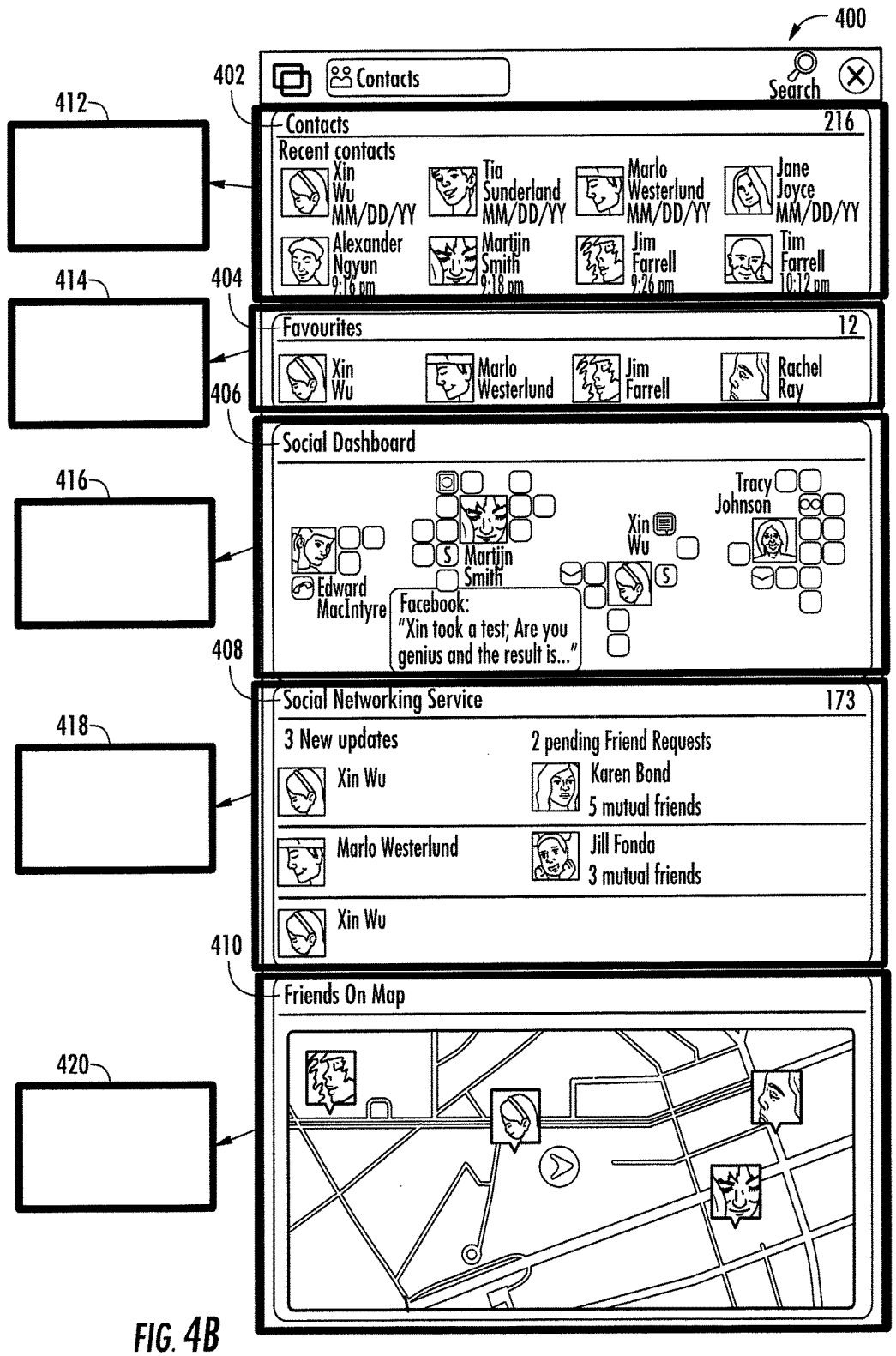
Figure 5A:
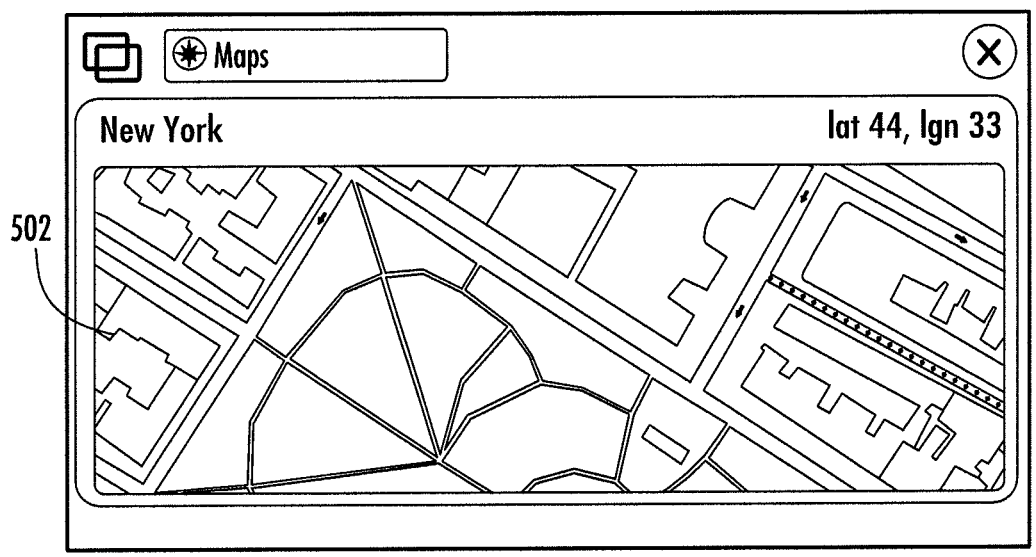
Figure 5B:
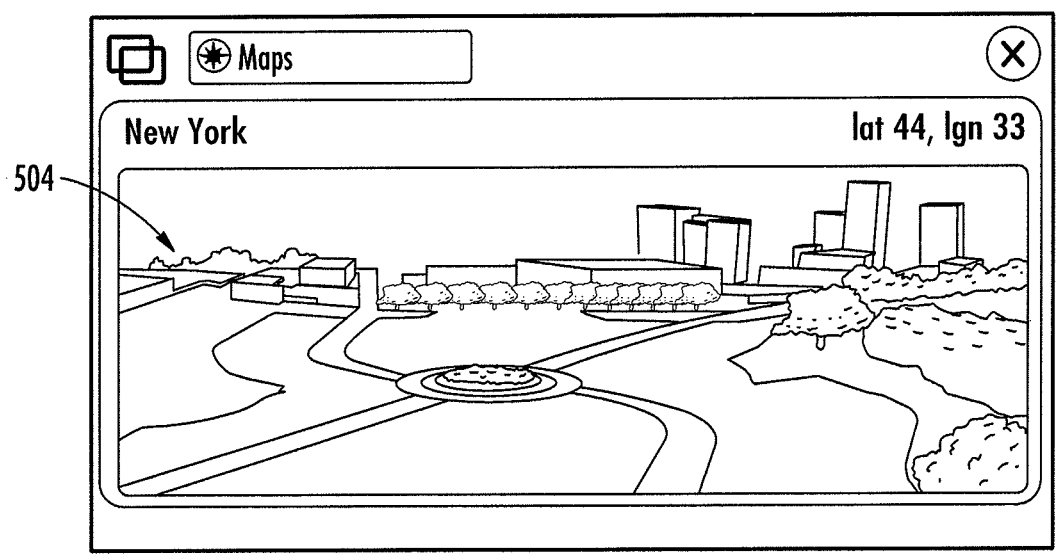
Figure 5C:
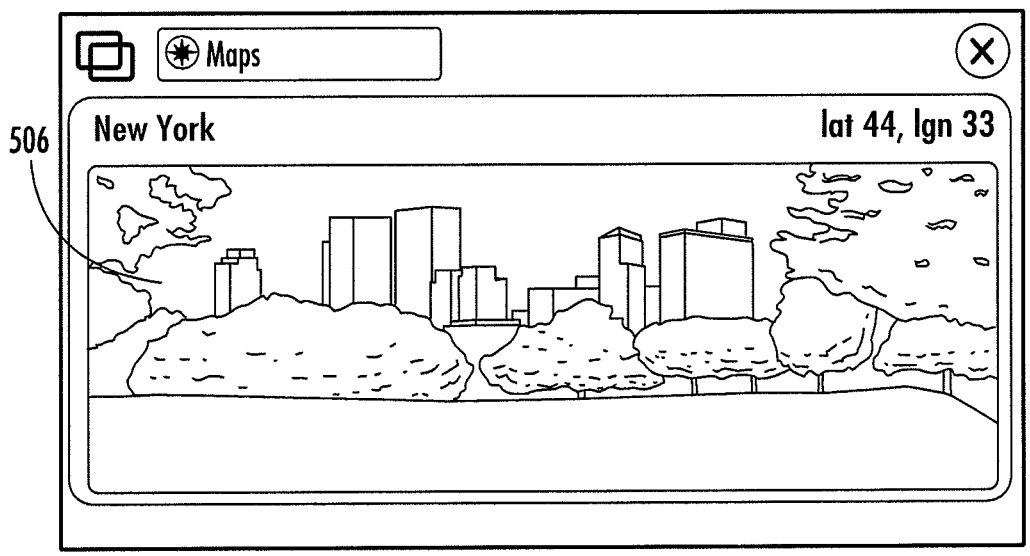
Figure 6:
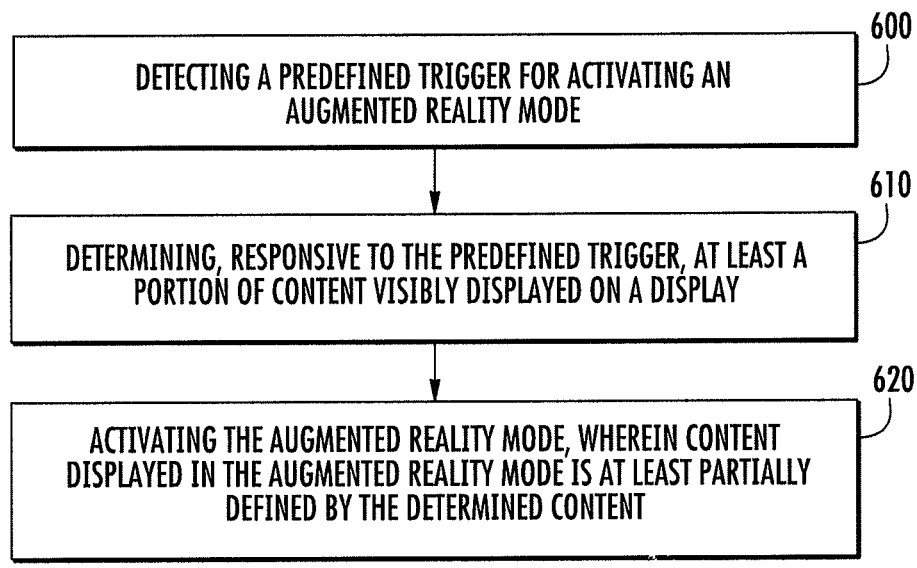
Figure 7:
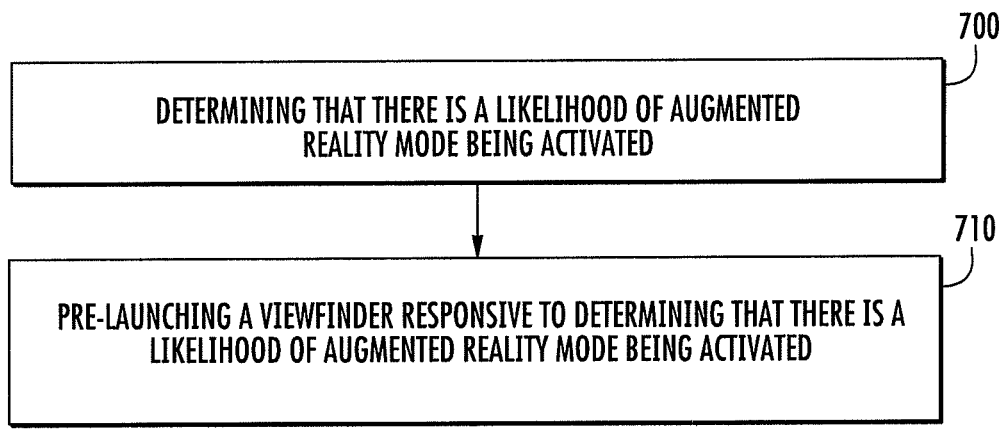

FIGS. 4a-b illustrate integration between a user interface and augmented reality mode according to an example embodiment;

FIGS. 5a-5c illustrate transition from a user interface to an augmented reality mode according to an example embodiment;

FIG. 6 illustrates a flowchart according to an example method for enhancing activation of an augmented reality mode according to an example embodiment; and FIG. 7 illustrates a flowchart according to an example method for enhancing activation of an augmented reality mode according to an example embodiment.

DETAILED DESCRIPTION

Some embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like reference numerals refer to like elements throughout.

As used herein, the terms "data," "content," "information" and similar terms may be used interchangeably to refer to data capable of being transmitted, received, displayed and/or stored in accordance with various example embodiments. Thus, use of any such terms should not be taken to limit the spirit and scope of the disclosure. Further, where a computing device is described herein to receive data from another computing device, it will be appreciated that the data may be received directly from the another computing device or may be received indirectly via one or more intermediary computing devices, such as, for example, one or more servers, relays, routers, network access points, base stations, and/or the like.

The term "computer-readable medium" as used herein refers to any medium configured to participate in providing information to a processor, including instructions for execution. Such a medium may take many forms, including, but not limited to a non-transitory computer-readable storage medium (e.g., non-volatile media, volatile media), and transmission media. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Examples of computer-readable media include a floppy disk, a flexible disk, hard disk, magnetic tape, any other magnetic medium, a compact disc read only memory (CD-ROM), compact disc compact disc-rewritable (CD-RW), digital versatile disc (DVD), Blu-Ray, any other optical medium, punch cards, paper tape, optical mark sheets, any other physical medium with patterns of holes or other optically recognizable indicia, a random access memory (RAM), a programmable read only memory (PROM), an erasable programmable read only memory (EPROM), a FLASH-EPROM, any other memory chip or cartridge, a carrier wave, or any other medium from which a computer can read. The term computer-readable storage medium is used herein to refer to any computer-readable medium except transmission media. However, it will be appreciated that where embodiments are described to use a computer-readable storage medium, other types of computer-readable mediums may be substituted for or used in addition to the computer-readable storage medium in alternative embodiments.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

Current augmented reality implementations are available through separate services and third party applications. In this regard, current augmented reality implementations are separate from and lack integration with standard operating system and application user interfaces used for performance and usage of general operations, tasks, services, and/or the like on a computing device. Accordingly, current augmented reality implementations do not provide a user with a seamless and intuitive experience. As such, users may not be able to utilize augmented reality in a manner that may integrate with and enhance a wide variety of computing services and operations accessed with and performed by modern computing devices, thereby limiting the use and practicality of augmented reality. Various example embodiments disclosed herein may address some deficiencies with current augmented reality implementations by enhancing activation of augmented reality mode, which may improve user experience by enhancing the accessibility, integration, and usefulness of augmented reality mode services.

Figure 1:
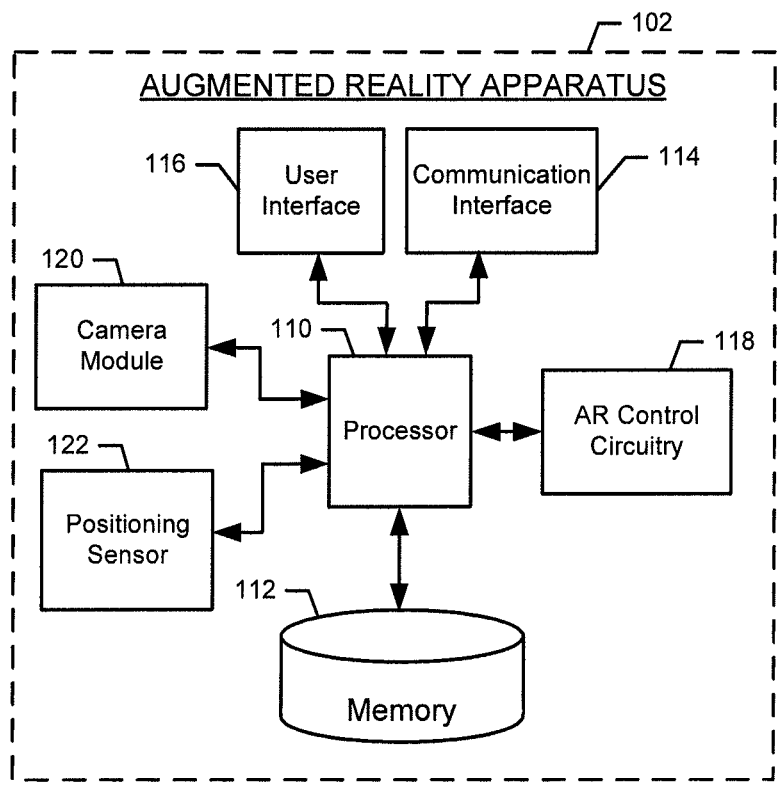
FIG. 1 illustrates a block diagram of an augmented reality apparatus for enhancing activation of an augmented reality mode according to an example embodiment.

FIG. 1 illustrates a block diagram of an augmented reality apparatus 102 for enhancing activation of an augmented reality mode according to an example embodiment. It will be appreciated that the augmented reality apparatus 102 is provided as an example of one embodiment and should not be construed to narrow the scope or spirit of the invention in any way. In this regard, the scope of the disclosure encompasses many potential embodiments in addition to those illustrated and described herein. As such, while FIG. 1 illustrates one example of a configuration of an augmented reality apparatus for enhancing activation of an augmented reality mode, other configurations may also be used to implement embodiments of the present invention.

The augmented reality apparatus 102 may be embodied as a desktop computer, laptop computer, mobile terminal, mobile computer, mobile phone, mobile communication device, one or more servers, one or more network nodes, game device, digital camera/camcorder, audio/video player, television device, radio receiver, digital video recorder, a headset, positioning device, chipset, a computing device comprising a chipset, any combination thereof, and/or the like. In an example embodiment, the augmented reality apparatus 102 is embodied as a mobile terminal, such as that illustrated in FIG. 2.

Figure 2:
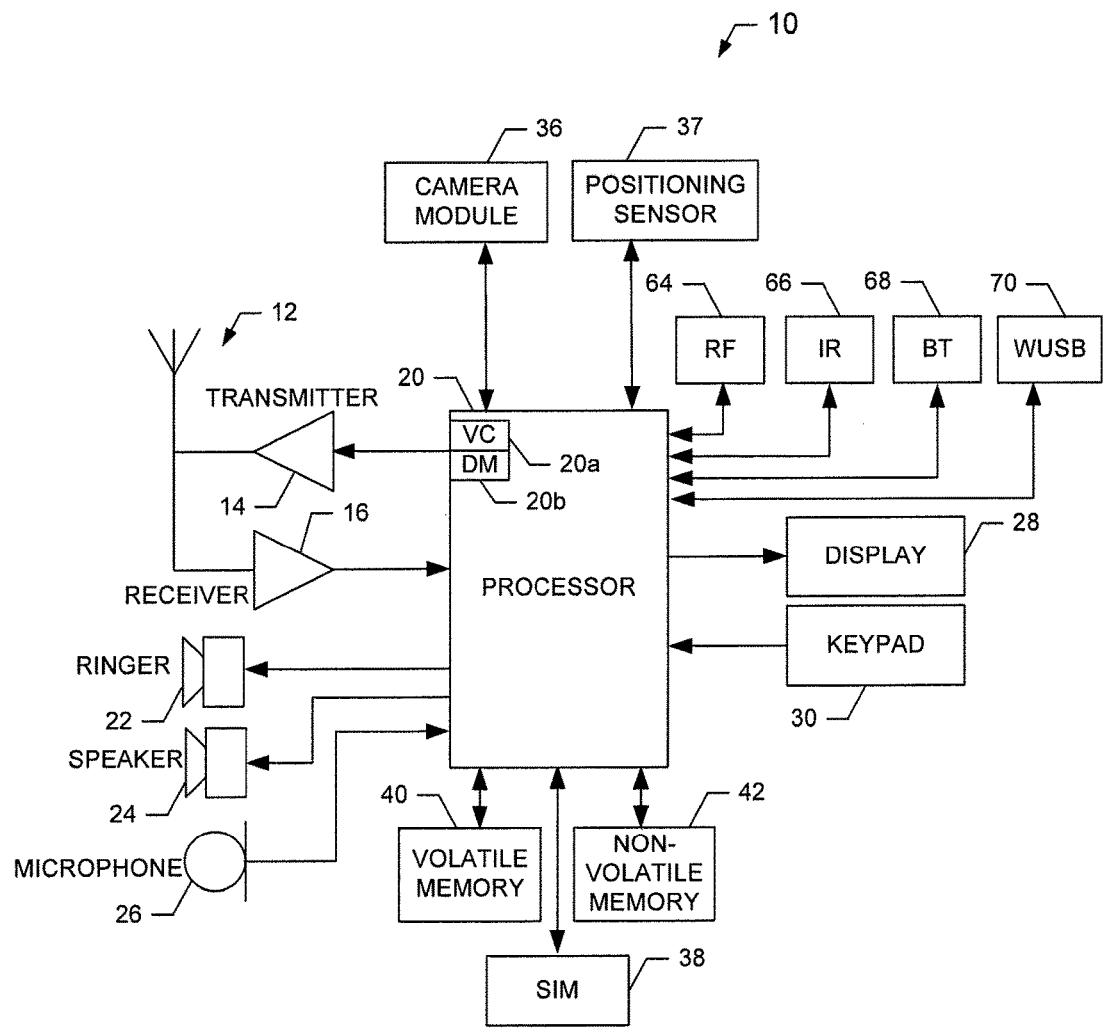
FIG. 2 is a schematic block diagram of a mobile terminal according to an example embodiment.

In this regard, FIG. 2 illustrates a block diagram of a mobile terminal 10 representative of one embodiment of an augmented reality apparatus 102. It should be understood, however, that the mobile terminal 10 illustrated and hereinafter described is merely illustrative of one type of augmented reality apparatus 102 that may implement and/or benefit from various embodiments of the invention and, therefore, should not be taken to limit the scope of the disclosure. While several embodiments of the electronic device are illustrated and will be hereinafter described for purposes of example, other types of electronic devices, such as mobile telephones, mobile computers, portable digital assistants (PDAs), pagers, laptop computers, desktop computers, gaming devices, televisions, and other types of electronic systems, may employ various embodiments of the invention.

As shown, the mobile terminal 10 may include an antenna 12 (or multiple antennas 12) in communication with a transmitter 14 and a receiver 16. The mobile terminal 10 may also include a processor 20 configured to provide signals to and receive signals from the transmitter and receiver, respectively. The processor 20 may, for example, be embodied as various means including circuitry, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 2 as a single processor, in some embodiments the processor 20 comprises a plurality of processors. These signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques such as Institute of Electrical and Electronics Engineers (IEEE) 802.11, 802.16, and/or the like. In addition, these signals may include speech data, user generated data, user requested data, and/or the like. In this regard, the mobile terminal may be capable of operating with one or more air interface standards, communication protocols, modulation types, access types, and/or the like. More particularly, the mobile terminal may be capable of operating in accordance with various first generation (1G), second generation (2G), 2.5G, third-generation (3G) communication protocols, fourth-generation (4G) communication protocols, Internet Protocol Multimedia Subsystem (IMS) communication protocols (e.g., session initiation protocol (SIP)), and/or the like. For example, the mobile terminal may be capable of operating in accordance with 2G wireless communication protocols IS-136 (Time Division Multiple Access (TDMA)), Global System for Mobile communications (GSM), IS-95 (Code Division Multiple Access (CDMA)), and/or the like. Also, for example, the mobile terminal may be capable of operating in accordance with 2.5G wireless communication protocols General Packet Radio Service (GPRS), Enhanced Data GSM Environment (EDGE), and/or the like. Further, for example, the mobile terminal may be capable of operating in accordance with 3G wireless communication protocols such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The mobile terminal may be additionally capable of operating in accordance with 3.9G wireless communication protocols such as Long Term Evolution (LTE) or Evolved Universal Terrestrial Radio Access Network (E-UTRAN) and/or the like. Additionally, for example, the mobile terminal may be capable of operating in accordance with fourth-generation (4G) wireless communication protocols and/or the like as well as similar wireless communication protocols that may be developed in the future.

Some Narrow-band Advanced Mobile Phone System (NAMPS), as well as Total Access Communication System (TACS), mobile terminals may also benefit from embodiments of this invention, as should dual or higher mode phones (e.g., digital/analog or TDMA/CDMA/analog phones). Additionally, the mobile terminal 10 may be capable of operating according to Wi-Fi or Worldwide Interoperability for Microwave Access (WiMAX) protocols.

It is understood that the processor 20 may comprise circuitry for implementing audio/video and logic functions of the mobile terminal 10. For example, the processor 20 may comprise a digital signal processor device, a microprocessor device, an analog-to-digital converter, a digital-to-analog converter, and/or the like. Control and signal processing functions of the mobile terminal may be allocated between these devices according to their respective capabilities. The processor may additionally comprise an internal voice coder (VC) 20a, an internal data modem (DM) 20b, and/or the like. Further, the processor may comprise functionality to operate one or more software programs, which may be stored in memory. For example, the processor 20 may be capable of operating a connectivity program, such as a web browser. The connectivity program may allow the mobile terminal 10 to transmit and receive web content, such as location-based content, according to a protocol, such as Wireless Application Protocol (WAP), hypertext transfer protocol (HTTP), and/or the like. The mobile terminal 10 may be capable of using a Transmission Control Protocol/Internet Protocol (TCP/IP) to transmit and receive web content across the interne or other networks.

The mobile terminal 10 may also comprise a user interface including, for example, an earphone or speaker 24, a ringer 22, a microphone 26, a display 28, a user input interface, and/or the like, which may be operationally coupled to the processor 20. In this regard, the processor 20 may comprise user interface circuitry configured to control at least some functions of one or more elements of the user interface, such as, for example, the speaker 24, the ringer 22, the microphone 26, the display 28, and/or the like. The processor 20 and/or user interface circuitry comprising the processor 20 may be configured to control one or more functions of one or more elements of the user interface through computer program instructions (e.g., software and/or firmware) stored on a memory accessible to the processor 20 (e.g., volatile memory 40, non-volatile memory 42, and/or the like). Although not shown, the mobile terminal may comprise a battery for powering various circuits related to the mobile terminal, for example, a circuit to provide mechanical vibration as a detectable output. The user input interface may comprise devices allowing the mobile terminal to receive data, such as a keypad 30, a touch display (not shown), a joystick (not shown), and/or other input device. In embodiments including a keypad, the keypad may comprise numeric (0-9) and related keys (#, *), and/or other keys for operating the mobile terminal.

As shown in FIG. 2, the mobile terminal 10 may also include one or more means for sharing and/or obtaining data. For example, the mobile terminal may comprise a short-range radio frequency (RF) transceiver and/or interrogator 64 so data may be shared with and/or obtained from electronic devices in accordance with RF techniques. The mobile terminal may comprise other short-range transceivers, such as, for example, an infrared (IR) transceiver 66, a Bluetooth™ (BT) transceiver 68 operating using Bluetooth™ brand wireless technology developed by the Bluetooth™ Special Interest Group, a wireless universal serial bus (USB) transceiver 70 and/or the like. The Bluetooth™ transceiver 68 may be capable of operating according to ultra-low power Bluetooth™ technology (e.g., Wibree™) radio standards. In this regard, the mobile terminal 10 and, in particular, the short-range transceiver may be capable of transmitting data to and/or receiving data from electronic devices within a proximity of the mobile terminal, such as within 10 meters, for example. Although not shown, the mobile terminal may be capable of transmitting and/or receiving data from electronic devices according to various wireless networking techniques, including Wi-Fi, WLAN techniques such as IEEE 802.11 techniques, IEEE 802.15 techniques, IEEE 802.16 techniques, and/or the like.

In an example embodiment, the mobile terminal 10 may include a media capturing element, such as a camera, video and/or audio module, in communication with the processor 20. The media capturing element may be any means for capturing an image, video and/or audio for storage, display or transmission. For example, in an example embodiment in which the media capturing element is a camera module 36, the camera module 36 may include a digital camera capable of forming a digital image file from a captured image. In addition, the digital camera of the camera module 36 may be capable of capturing a video clip. As such, the camera module 36 may include all hardware, such as a lens or other optical component(s), and software necessary for creating a digital image file from a captured image as well as a digital video file from a captured video clip. Alternatively, the camera module 36 may include only the hardware needed to view an image, while a memory device of the mobile terminal 10 stores instructions for execution by the processor 20 in the form of software necessary to create a digital image file from a captured image. As yet another alternative, an object or objects within a field of view of the camera module 36 may be displayed on the display 28 of the mobile terminal 10 to illustrate a view of an image currently displayed which may be captured if desired by the user. As such, as referred to hereinafter, an image may be either a captured image or an image comprising the object or objects currently displayed by the mobile terminal 10, but not necessarily captured in an image file. In an example embodiment, the camera module 36 may further include a processing element such as a co-processor which assists the processor 20 in processing image data and an encoder and/or decoder for compressing and/or decompressing image data. The encoder and/or decoder may encode and/or decode according to, for example, a joint photographic experts group (JPEG) standard, a moving picture experts group (MPEG) standard, or other format.

The mobile terminal 10 may further include a positioning sensor 37. The positioning sensor 37 may include, for example, a global positioning system (GPS) sensor, an assisted global positioning system (Assisted-GPS) sensor, etc. In one embodiment, however, the positioning sensor 37 includes a pedometer, accelerometer, or inertial sensor. Further, the positioning sensor may determine the location of the mobile terminal 10 based upon signal triangulation or other mechanisms. The positioning sensor 37 may be configured to determine a location of the mobile terminal 10, such as latitude and longitude coordinates of the mobile terminal 10 or a position relative to a reference point such as a destination or a start point. Information from the positioning sensor 37 may be communicated to a memory of the mobile terminal 10 or to another memory device to be stored as a position history or location information. Furthermore, the memory of the mobile terminal 10 may store instructions for determining cell id information. In this regard, the memory may store an application program for execution by the processor 20, which may determine an identity of the current cell (e.g., cell id identity or cell id information) with which the mobile terminal 10 is in communication. In conjunction with the positioning sensor 37, the cell id information may be used to more accurately determine a location of the mobile terminal 10.

In an example embodiment, the positioning sensor 37 may comprise an accelerometer, inertial sensor, and/or pedometer, which may be used to determine a state of motion, a trajectory of motion, and/or the like of the mobile terminal 10. In embodiments where the positioning sensor comprises a GPS sensor or the like, a state of motion, trajectory of motion, and/or the like of the mobile terminal 10 may also be determined. In this regard, the positioning sensor may be configured to determine whether the mobile terminal 10 is in motion based upon whether the location of the mobile terminal 10 is changing over an interval 10. In some example embodiments, the positioning sensor 37 may be configured to determine a degree or severity of this state of motion based upon, for example, the distance traveled by the mobile terminal 10 over a time interval, an angle of a trajectory of motion of the mobile terminal 10, and/or the like.

The mobile terminal 10 may comprise memory, such as a subscriber identity module (SIM) 38, a removable user identity module (R-UIM), and/or the like, which may store information elements related to a mobile subscriber. In addition to the SIM, the mobile terminal may comprise other removable and/or fixed memory. The mobile terminal 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices (e.g., hard disks, floppy disk drives, magnetic tape, etc.), optical disc drives and/or media, non-volatile random access memory (NVRAM), and/or the like. Like volatile memory 40 non-volatile memory 42 may include a cache area for temporary storage of data. The memories may store one or more software programs, instructions, pieces of information, data, and/or the like which may be used by the mobile terminal for performing functions of the mobile terminal. For example, the memories may comprise an identifier, such as an international mobile equipment identification (IMEI) code, capable of uniquely identifying the mobile terminal 10.

Returning to FIG. 1, in an example embodiment, the augmented reality apparatus 102 includes various means for performing the various functions herein described. These means may comprise one or more of a processor 110, memory 112, communication interface 114, user interface 116, augmented reality (AR) control circuitry 118, camera module 120, or positioning sensor 122. The means of the augmented reality apparatus 102 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g. memory 112) that is executable by a suitably configured processing device (e.g., the processor 110), or some combination thereof.

In some example embodiments, one or more of the means illustrated in FIG. 1 may be embodied as a chip or chip set. In other words, the augmented reality apparatus 102 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. In this regard, the processor 110, memory 112, communication interface 114, user interface 116, augmented reality control circuitry 118, camera module 120, and/or positioning sensor 122 may be embodied as a chip or chip set. The augmented reality apparatus 102 may therefore, in some example embodiments, be configured to implement embodiments of the present invention on a single chip or as a single "system on a chip." As another example, in some example embodiments, the augmented reality apparatus 102 may comprise component(s) configured to implement embodiments of the present invention on a single chip or as a single "system on a chip." As such, in some cases, a chip or chipset may constitute means for performing one or more operations for providing the functionalities described herein and/or for enabling user interface navigation with respect to the functionalities and/or services described herein.

The processor 110 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an ASIC (application specific integrated circuit) or FPGA (field programmable gate array), or some combination thereof. Accordingly, although illustrated in FIG. 1 as a single processor, in some embodiments the processor 110 comprises a plurality of processors. The plurality of processors may be in operative communication with each other and may be collectively configured to perform one or more functionalities of the augmented reality apparatus 102 as described herein. The plurality of processors may be embodied on a single computing device or distributed across a plurality of computing devices collectively configured to function as the augmented reality apparatus 102. In embodiments wherein the augmented reality apparatus 102 is embodied as a mobile terminal 10, the processor 110 may be embodied as or comprise the processor 20. In some example embodiments, the processor 110 is configured to execute instructions stored in the memory 112 or otherwise accessible to the processor 110. These instructions, when executed by the processor 110, may cause the augmented reality apparatus 102 to perform one or more of the functionalities of the augmented reality apparatus 102 as described herein. As such, whether configured by hardware or software methods, or by a combination thereof, the processor 110 may comprise an entity capable of performing operations according to embodiments of the present invention while configured accordingly. Thus, for example, when the processor 110 is embodied as an ASIC, FPGA or the like, the processor 110 may comprise specifically configured hardware for conducting one or more operations described herein. Alternatively, as another example, when the processor 110 is embodied as an executor of instructions, such as may be stored in the memory 112, the instructions may specifically configure the processor 110 to perform one or more algorithms and operations described herein.

The memory 112 may comprise, for example, volatile memory, non-volatile memory, or some combination thereof. In this regard, the memory 112 may comprise a non-transitory computer-readable storage medium. Although illustrated in FIG. 1 as a single memory, the memory 112 may comprise a plurality of memories. The plurality of memories may be embodied on a single computing device or may be distributed across a plurality of computing devices collectively configured to function as the augmented reality apparatus 102. In various example embodiments, the memory 112 may comprise a hard disk, random access memory, cache memory, flash memory, a compact disc read only memory (CD-ROM), digital versatile disc read only memory (DVD-ROM), an optical disc, circuitry configured to store information, or some combination thereof. In embodiments wherein the augmented reality apparatus 102 is embodied as a mobile terminal 10, the memory 112 may comprise the volatile memory 40 and/or the non-volatile memory 42. The memory 112 may be configured to store information, data, applications, instructions, or the like for enabling the augmented reality apparatus 102 to carry out various functions in accordance with various example embodiments. For example, in some example embodiments, the memory 112 is configured to buffer input data for processing by the processor 110. Additionally or alternatively, the memory 112 may be configured to store program instructions for execution by the processor 110. The memory 112 may store information in the form of static and/or dynamic information. This stored information may be stored and/or used by the augmented reality control circuitry 118 during the course of performing its functionalities.

The communication interface 114 may be embodied as any device or means embodied in circuitry, hardware, a computer program product comprising computer readable program instructions stored on a computer readable medium (e.g., the memory 112) and executed by a processing device (e.g., the processor 110), or a combination thereof that is configured to receive and/or transmit data from/to another computing device. In an example embodiment, the communication interface 114 is at least partially embodied as or otherwise controlled by the processor 110. In this regard, the communication interface 114 may be in communication with the processor 110, such as via a bus. The communication interface 114 may include, for example, an antenna, a transmitter, a receiver, a transceiver and/or supporting hardware or software for enabling communications with one or more remote computing devices. The communication interface 114 may be configured to receive and/or transmit data using any protocol that may be used for communications between computing devices. In this regard, the communication interface 114 may be configured to receive and/or transmit data using any protocol that may be used for transmission of data over a wireless network, wireline network, some combination thereof, or the like by which the augmented reality apparatus 102 and one or more computing devices may be in communication. As an example, the communication interface 114 may be configured to receive and/or transmit content over a network (e.g., the network 306 illustrated in FIG. 3) from a server or other content source (e.g., the content source 304). The communication interface 114 may additionally be in communication with the memory 112, user interface 116, augmented reality control circuitry 118, camera module 120, and/or positioning sensor 122, such as via a bus.

The user interface 116 may be in communication with the processor 110 to receive an indication of a user input and/or to provide an audible, visual, mechanical, or other output to a user. As such, the user interface 116 may include, for example, a keyboard, a mouse, a joystick, a display, a touch screen display, a microphone, a speaker, and/or other input/output mechanisms. In embodiments wherein the user interface 116 comprises a touch screen display, the user interface 116 may additionally be configured to detect and/or receive indication of a touch gesture or other input to the touch screen display. The user interface 116 may be in communication with the memory 112, communication interface 114, augmented reality control circuitry 118, camera module 120, and/or positioning sensor 122, such as via a bus.

The augmented reality control circuitry 118 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. In embodiments wherein the augmented reality control circuitry 118 is embodied separately from the processor 110, the augmented reality control circuitry 118 may be in communication with the processor 110. The augmented reality control circuitry 118 may further be in communication with one or more of the memory 112, communication interface 114, user interface 116, camera module 120, or positioning sensor 122, such as via a bus.

The camera module 120 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. The camera module 120 may be configured to control an image capture device embodied on or in operative communication with the augmented reality apparatus 102. Additionally or alternatively, the camera module 120, itself, may comprise an image capture device. Accordingly, the camera module 120 may be configured to capture and/or control the capture of images, video, and/or the like that may be used in providing a real world view used in an augmented reality display. In embodiments wherein the augmented reality apparatus 102 is embodied as a mobile terminal 10, the camera module 120 may comprise and/or may be configured to control the camera module 36. As another example, in some embodiments wherein the augmented reality apparatus is not embodied as a mobile terminal 10, the camera module 120 may be embodied as an entity and/or configured to control an entity substantially similar to the camera module 36. The camera module 120 may further be in communication with one or more of the memory 112, communication interface 114, user interface 116, augmented reality control circuitry 118, or positioning sensor 122, such as via a bus. In some embodiments, however, aspects of the camera module 120 may be scaled back or the camera module 120 may even be eliminated. Accordingly, it will be appreciated that the camera module 120 is illustrated in FIG. 1 by way of example and not by way of limitation, as in some embodiments, the augmented reality apparatus 102 may not include a camera module 120.

The positioning sensor 122 may be embodied as various means, such as circuitry, hardware, a computer program product comprising computer readable program instructions stored on a computer readable medium (e.g., the memory 112) and executed by a processing device (e.g., the processor 110), or some combination thereof and, in some embodiments, is embodied as or otherwise controlled by the processor 110. The positioning sensor 122 may be configured to determine a trajectory of motion of the augmented reality apparatus 102. In this regard, the positioning sensor 122 may comprise and/or be configured to collect data from an accelerometer, inertial sensor, gyroscope, pedometer, and/or the like to determine a state of motion, a trajectory of motion, a severity of motion, and/or the like. In some example embodiments, the augmented reality control circuitry 118 may be configured to use information about a motion of the augmented reality apparatus 102 as determined by the positioning sensor 122 to control activation of an augmented reality mode. The positioning sensor 122 may additionally or alternatively be configured to determine and/or estimate a position or location of the augmented reality apparatus 102 (e.g., latitude and longitude coordinates of the augmented reality apparatus 102, a position relative to a reference point such as a destination or a start point of the augmented reality apparatus 102, a street address of the augmented reality apparatus 102, and/or the like). In this regard, the positioning sensor 122 may comprise and/or be configured to collect data from a GPS sensor, assisted GPS sensor, and/or other entity configured to ascertain a position of the augmented reality apparatus 102. In embodiments wherein the augmented reality apparatus 102 is embodied as a mobile terminal 10, the positioning sensor 122 may comprise and/or may be configured to control the positioning sensor 37. As another example, in some embodiments wherein the augmented reality apparatus is not embodied as a mobile terminal 10, the positioning sensor 122 may be embodied as an entity and/or configured to control an entity substantially similar to the positioning sensor 37. The positioning sensor 122 may further be in communication with one or more of the memory 112, communication interface 114, user interface 116, augmented reality control circuitry 118, or camera module 120, such as via a bus. In some embodiments, however, aspects of the positioning sensor 122 may be scaled back or the positioning sensor 122 may even be eliminated. Accordingly, it will be appreciated that the positioning sensor 122 is illustrated in FIG. 1 by way of example and not by way of limitation, as in some embodiments, the augmented reality apparatus 102 may not include a positioning sensor 122.

Figure 3:
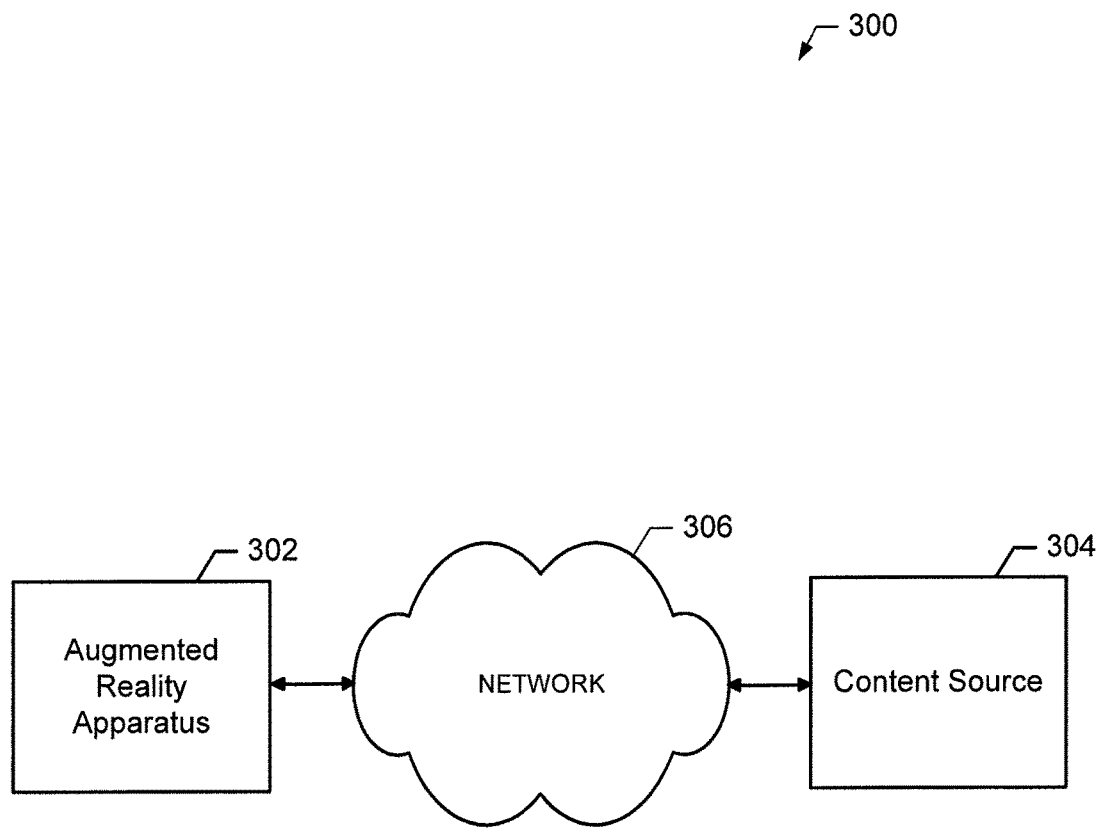
FIG. 3 illustrates a system for enhancing activation of an augmented reality mode according to an example embodiment.

FIG. 3 illustrates a system 300 for enhancing activation of an augmented reality mode according to an example embodiment. The system 300 may comprise an augmented reality apparatus 302 and a content source 304 configured to communicate over the network 306. The augmented reality apparatus 302 may, for example, comprise an embodiment of the augmented reality apparatus 102 wherein the augmented reality apparatus 102 is configured to communicate with a remote content source 304 over a network 306 to access content available from the content source 304. The accessed content may, for example, comprise an image, data, graphic, icon, and/or the like that may be used in an augmented reality mode by the augmented reality apparatus 102. In this regard, the content may, for example, comprise content about and/or relevant to an object or entity depicted in a real world view displayed in an augmented reality mode.

The content source 304 may comprise any computing device configured to provide content, to the augmented reality apparatus 302 over the network 306. In this regard, the content source 304 may comprise, for example, a network attached storage device, a server, a desktop computer, laptop computer, mobile terminal, mobile computer, mobile phone, mobile communication device, audio/video player, any combination thereof, and/or the like that is configured to provide and/or otherwise share content with the augmented reality apparatus 302. The network 306 may comprise a wireline network, wireless network (e.g., a cellular network, wireless local area network, wireless wide area network, some combination thereof, or the like), or a combination thereof, and in one embodiment comprises the internet.

Accordingly, it will be appreciated that content described to be displayed in a user interface, augmented reality mode, and/or the like in accordance with various embodiments disclosed herein may comprise content accessed by the augmented reality apparatus 102 from a content source 304 over a network 306. Additionally or alternatively, such displayed content may comprise content that is captured by the augmented reality apparatus 302 and/or locally stored at the augmented reality apparatus 302, such as in the memory 112.

In some example embodiments, the augmented reality control circuitry 118 is configured to detect a predefined trigger for activating an augmented reality mode. Detection of the predefined trigger may, for example, comprise the actual detection of the trigger, receipt of a signal originated by a detector (e.g., the processor 110, communication interface 114, user interface 116, camera module 120, positioning sensor 122, and/or the like) that actually detected the predefined trigger, and/or the like. The trigger may comprise any predefined user input, event, combination thereof, or the like that is defined as a trigger for activation of the augmented reality mode. Accordingly, for example, the predefined trigger may comprise detection of a user selection of a key, button, a predefined touch gesture to a touch screen, hand/finger gestures (for example, a gesture not actually contacting a display and/or not actually contacting the augmented reality apparatus 102) and/or the like. As another example, the predefined trigger may comprise a user opening a camera lens or otherwise activating a camera, such as may be embodied on the camera module 120. As still a further example, the predefined trigger may comprise movement of the augmented reality apparatus 102 along a predefined trajectory of motion. For example, the predefined trajectory may comprise movement of the augmented reality apparatus 102 along an upward arc, a substantially vertical trajectory, and/or the like, which may, for example, indicate that a user is raising the augmented reality apparatus 102 to a position to enable capture of images of the real world for use in the augmented reality mode. Accordingly, the augmented reality control circuitry 118 may be configured to determine whether the augmented reality apparatus 102 is moving on a predefined trajectory defined as a trigger for activating augmented reality mode on the basis of information that may be provided by the positioning sensor 122.

The augmented reality control circuitry 118 may be further configured to determine, responsive to detection of a predefined trigger, at least a portion of content that is visibly displayed, such as on one or more displays. In this regard, one or more graphical user interfaces, such as for an application, operating system, and/or the like, may be displayed on a display(s) when the trigger for activating the augmented reality mode is detected. The one or more displays may, for example, comprise displays of the user interface 116. As another example, the one or more displays may comprise one or more displays that are in operative communication with the augmented reality apparatus 102. As still a further example, the one or more displays may comprise one or more projection displays, such as a projection screen, an object on which content may be projected, a three-dimensional virtual display, a holographic display, and/or the like. As such, it will be appreciated that the augmented reality control circuitry 118 may be configured to determine content that may be visibly displayed on any display, screen, or other space that may be used to display content including, for example, a cathode ray tube (CRT) display, a plasma display panel (PDP), a liquid crystal display (LCD), a light-emitting diode (LED), an organic light-emitting diode display (OLED), a projector, a holographic display or the like.

As an example with reference to FIG. 4a, a graphical user interface 400 is illustrated. While the user interface 400 has a canvas layout with content organized in a plurality of "containers" or sections (e.g., the section 402 including contacts, the section 404 containing favorite contacts, the section 406 containing social dashboard content, the section 408 containing content for a social networking service, and the section 410 containing map content), it will be appreciated that user interfaces are not limited to this arrangement. As such, the user interface 400 is provided by way of example and not by way of limitation. In various embodiments, a user interface displayed when a trigger for activating an augmented reality mode is detected may take on any of a variety of layouts, forms, or the like, and may include content in addition to or in lieu of that displayed in the user interface 400.

Due to display size limitations, a zoom level used to view a user interface, and/or the like, only a portion of content of a user interface, such as the user interface 400 may be visibly displayed on a display at a given point in time. In this regard, a user may scroll (e.g., horizontally, vertically, and/or the like) a user interface, zoom in and out on the user interface, and/or the like in order to view various portions of the user interface in a display. At least a portion of the content that is visibly displayed when a trigger for activating augmented reality mode is detected may be content which a user would like to be displayed in augmented reality mode. As such, the augmented reality control circuitry 118 may determine at least a portion of the content that is visibly displayed. In some embodiments, the augmented reality control circuitry 118 may determine all of the content that is visibly displayed. In other embodiments, the augmented reality control circuitry 118 may determine a portion of the content that is visibly displayed. As an example, the augmented reality control circuitry 118 may determine content visibly displayed in a predefined portion of a display, such as a central or prominent portion of the display. As another example, the augmented reality control circuitry 118 may determine visibly displayed content that is highlighted, selected, or the like. For example, the augmented reality control circuitry 118 may determine visibly displayed content that is in a selected portion (e.g., a selected section or container) of a user interface. As yet another example, the augmented reality control circuitry 118 may determine visibly displayed content of one or more predefined types. For example, the augmented reality control circuitry 118 may determine visibly displayed contact-related content, map content, scheduling content, location-related content, some combination thereof, or the like. As yet another example, the augmented reality control circuitry 118 may determine visibly displayed content which is associated with or otherwise has such content available which can be shown in augmented reality view.

As yet another example, the augmented reality control circuitry 118 may determine visibly displayed content which has special relevance to the user in a given moment and show that content/information in augmented reality view. The augmented reality control circuitry 118 may, for example, be configured to determine whether content has special relevance to the user based at least in part on predefined user preferences, historical usage patterns for the user, the user's context, the context of the augmented reality apparatus 102, some combination thereof, or the like. In some embodiments, the augmented reality control circuitry 118 may be configured to determine a relevance value (for example, based on predefined user preferences, historical usage patterns for the user, the user's context, the context of the augmented reality apparatus 102, some combination thereof, or the like) for each of one or more displayed contents and determine one or more displayed contents having a relevance value satisfying a predefined relevancy threshold. As an example, a user context may be "hungry" and a known user preference (e.g., predefined user preference and/or preference learned based on user history) may be for a particular type of food. Accordingly, the augmented reality control circuitry 118 may be configured to determine visibly displayed content corresponding to restaurants serving the preferred type of food. However, after the user has finished eating, the restaurant content may no longer be displayed in the augmented reality mode view.

Referring now to FIG. 4b, FIG. 4b illustrates the user interface 400 with the various containers highlighted to show how content may be selected and determined for use in an augmented reality mode that is integrated with a standard user interface. In this regard, if the section 402 including contacts is selected or otherwise visibly displayed such that it is determined by the augmented reality control circuitry 118, then the contact content may be determined for display in augmented reality mode, as indicated by the extraction box 412. Additionally or alternatively, if the section 404 containing favorite contacts is selected or otherwise visibly displayed such that it is determined by the augmented reality control circuitry 118, then the favorite contact content may be determined for display in augmented reality mode, as indicated by the extraction box 414. Additionally or alternatively, if the section 406 containing social dashboard content is selected or otherwise visibly displayed such that it is determined by the augmented reality control circuitry 118, then the social dashboard content may be determined for display in augmented reality mode, as indicated by the extraction box 416. Additionally or alternatively, if the section 408 containing content for a social networking service is selected or otherwise visibly displayed such that it is determined by the augmented reality control circuitry 118, then the social networking service content may be determined for display in augmented reality mode, as indicated by the extraction box 418. Additionally or alternatively, if the section 410 containing map content is selected or otherwise visibly displayed such that it is determined by the augmented reality control circuitry 118, then the map content may be determined for display in augmented reality mode, as indicated by the extraction box 420.

Accordingly, by way of example, if a user of the user interface 400 wishes for the social networking service content displayed in the section 408 to be displayed in or otherwise used in augmented reality mode, once activated, the user may manipulate the user interface 400 such that the section 408 is visibly displayed, is selected, is displayed in a predefined portion of a display, and/or the like. The user may then provide a predefined trigger to activate the augmented reality mode that may be detected by the augmented reality control circuitry 118. The augmented reality control circuitry 118 may, in response to detection of the trigger, determine the social networking service content that was selected by the user.

In some embodiments, the augmented reality control circuitry 118 may be configured to determine content for display in augmented reality mode in addition to or in lieu of content that is visibly displayed. This additional or alternative content may, for example, be determined based at least in part on predefined user preferences, the user's context, the context of the augmented reality apparatus 102, and/or the like. As another example, the augmented reality control circuitry 118 may be configured to determine content presented to or available to a user by way of means other than visual display. For example, the augmented reality control circuitry 118 may be configured to determine content that is audibly reproduced. As such, the augmented reality control circuitry 118 may, for example, be configured to determine content that is audibly produced at the time when a trigger for activating augmented reality mode is detected, within a predefined period (e.g., within a predefined time span prior to and/or following) of the time when a trigger for activating augmented reality mode is detected, and/or the like.

As still a further example, the augmented reality control circuitry 118 may be configured to determine audio or other content captured at the time when a trigger for activating augmented reality mode is detected, within a predefined period (e.g., within a predefined time span prior to and/or following) of the time when a trigger for activating augmented reality mode is detected, and/or the like. The captured content may, for example, comprise audio annotations made by a user of the augmented reality apparatus 102, environmental sensory data (e.g., context data) captured by the augmented reality apparatus 102, and/or the like. The augmented reality control circuitry 118 may be configured to analyze the captured content to derive additional information that may be used for display in the augmented reality mode. For example, the augmented reality control circuitry 118 may be configured to analyze captured audio to identify an individual by a captured voice, identify objects producing captured sounds (e.g., various wildlife, cars, nature features, and/or the like).

The augmented reality control circuitry 118 may be additionally configured to activate the augmented reality mode. In this regard, the augmented reality control circuitry 118 may cause the user interface for the augmented reality mode to be displayed. The displayed augmented reality mode interface may include content that is at least partially defined by the content determined in response to detection of the predefined trigger. For example, the content may be at least partially defined by content determined to be displayed in the standard user interface in response to detection of the predefined trigger. As a further example, the content may be at least partially defined by determined captured content. The user interface may, for example, further include images and/or video captured by the camera module 120, captured audio, and/or the like.

As an example, if contact content was determined to be visibly displayed, then the augmented reality mode may indicate a location of a contact that is within the view of the augmented reality apparatus 102. As another example, if calendar and/or scheduling content were determined to be visibly displayed, then an indication of a location of a meeting or event that is within the view of the augmented reality apparatus 102 may be displayed in the augmented reality mode view. As a further example, if address information, such as may have been displayed in a web page, was determined to have been visibly displayed, then an indication of that address may be displayed in the augmented reality mode over a real world image of the corresponding location. As still a further example, if contact information or other information about an individual was determined to be visibly displayed, then a virtual reality avatar of the individual may be displayed in the augmented reality mode. As yet another example, if an image gallery or other multimedia content was determined to be visibly displayed, then the multimedia content may be displayed in augmented reality mode with a real world image as a background.

In some example embodiments, the augmented reality control circuitry 118 may be configured to avoid accidental activation of augmented reality mode. In this regard, the augmented reality control circuitry 118 may determine whether a predefined condition exists in an instance in which a trigger for activating augmented reality mode is detected. If the condition exists, the augmented reality control circuitry 118 may activate the augmented reality mode. If, however, the condition does not exist, the augmented reality control circuitry 118 may not activate the augmented reality mode because it may be determined that the user does not actually wish to activate the augmented reality mode. As an example, visible display of map content (for example, the map content 410) may comprise a predefined condition. Accordingly, the augmented reality control circuitry 118 may be configured to determine, responsive to detection of a trigger for activating augmented reality mode, whether map content is visibly displayed on a display. In this example, if map content is visibly displayed, the augmented reality control circuitry 118 may proceed with activation of augmented reality mode. If, however, in this example, the map content is not visibly displayed, the augmented reality control circuitry 118 may determine that activation of augmented reality mode was not intended and may not activate augmented reality mode.

As described, the display of content in augmented reality mode that is influenced by content determined to be visibly displayed in a user interface in an instance in which a trigger for activating augmented reality mode is detected may provide a measure of integration between a standard user interface and an augmented reality mode. Some example embodiments may provide a further measure of integration by providing a transition effect between a standard user interface and augmented reality mode in an instance in which augmented reality mode is activated. The transition effect may comprise a fading effect, gradual transition of the graphic display to augmented reality mode, and/or the like.

In some example embodiments, the user interface displayed when a trigger for activating augmented reality mode is detected may comprise a two-dimensional (2D) display view. In activating the augmented reality mode, the augmented reality control circuitry 118 may transition from the 2D display view to a three-dimensional (3D) display view of at least a portion of the content displayed in the 2D display view. The augmented reality control circuitry 118 may apply a transition effect, such as fading, gradual transition, and/or the like to the transition from the 2D display view to the 3D display view. The augmented reality control circuitry 118 may further transition from the 3D display view to an augmented reality display view, thereby providing a gradual transition from a standard user interface to an augmented reality mode interface. The augmented reality control circuitry 118 may apply a transition effect, such as fading, gradual transition, and/or the like to the transition from the 3D display view to the augmented reality mode display view.

Referring now to FIG. 5, FIG. 5 illustrates a series of images of a transition from a user interface to an augmented reality mode according to an example embodiment. In this regard, FIG. 5a illustrates 2D map content 502 displayed in a user interface, which may be displayed when a trigger for activating augmented reality mode is detected. FIG. 5b illustrates a 3D map view 504 of the location illustrated in the 2D map content 502. FIG. 5c illustrates the location in an example augmented reality mode view 506.

In other embodiments, however, the augmented reality control circuitry 118 may be configured to first cause display of a 3D display view (e.g., the 3D map view 504) when activating an augmented reality mode. In such embodiments, display of the 2D display view may be skipped and thus there may not be a transition from a 2D display view to a 3D display view. In still other embodiments, there may not be display of either a 2D display view or an intermediate 3D display view. In this regard, the augmented reality mode view may be directly displayed upon activation without a preceding transitional 2D display view and/or 3D display view.

In some example embodiments, the augmented reality control circuitry 118 may transition from a 3D display view to an augmented reality mode display view responsive to detection of a second predefined trigger. This second predefined trigger may comprise, for example, a second user input, such as pressing a key, button, providing a touch gesture or the like. As another example, in an instance in which the predefined trigger for activating augmented reality mode comprises detection of movement of the augmented reality mode apparatus 102 along a predefined trajectory, the second predefined trigger may comprise termination of the trajectory. Thus, for example, if the predefined trajectory comprises a substantially upward vertical trajectory, an upward arc, or the like, the second predefined trigger may comprise termination of that upward movement. Termination of this trajectory may, for example, indicate that the user has positioned the augmented reality apparatus 102 at a level where the camera module 120 may capture images of a desired location or object for display in augmented reality mode.

In some example embodiments, the augmented reality control circuitry 118 may be configured to determine in advance of detecting a trigger for activating augmented reality mode whether there is a likelihood (e.g., at least a predefined probability) of the augmented reality mode being activated. In this regard, the augmented reality control circuitry 118 may utilize context data regarding usage of the augmented reality apparatus 102, the environment in which the augmented reality apparatus 102 is located, and/or the like to determine whether there is a likelihood of the augmented reality mode being activated. For example, if a user interface view is displayed that includes content that may be shown in augmented reality mode, the augmented reality control circuitry 118 may determine that there is a likelihood of augmented reality mode being activated. As another example, the augmented reality control circuitry 118 may maintain and/or have access to a history of prior usage patterns of the augmented reality apparatus 102. If a current use or usage pattern of the augmented reality apparatus 102 corresponds with a pattern historically occurring prior to activation of augmented reality mode, then the augmented reality control circuitry 118 may determine that there is a likelihood of activation of augmented reality mode. As another example, the augmented reality control circuitry 118 may determine from context data indicating the location of the augmented reality apparatus 102, the environmental surroundings of the augmented reality apparatus 102, and/or the like whether there is a likelihood of activation of augmented reality mode. In this regard, if augmented reality mode has been historically activated when conditions were substantially similar to those indicated by the context data, the augmented reality control circuitry 118 may determine that there is a likelihood of activation of augmented reality mode. As yet another example, the augmented reality control circuitry 118 may detect hand gestures and/or movement of the augmented reality apparatus 102 in a manner that suggests the user is about to activate augmented reality mode and may accordingly determine that there is a likelihood of activation of augmented reality mode.

In an instance in which the augmented reality control circuitry 118 determines that there is a likelihood of activation of augmented reality mode, the augmented reality control circuitry 118 may pre-launch a viewfinder. In this regard, the augmented reality control circuitry 118 may pre-launch a viewfinder application used for capturing images for use in augmented reality mode, pre-launch/pre-activate hardware used for capturing images for use in augmented reality mode, and/or the like. For example, the augmented reality control circuitry 118 may pre-launch viewfinder hardware and/or software needed for use of the camera module 120. Accordingly, it will be appreciated that "viewfinder" is used generically to refer to any hardware, software, firmware, or combination thereof that may be used to capture real world images for use in augmented reality mode. Launching a viewfinder may take some time. Accordingly, if the viewfinder is launched concurrent with or responsive to activation of augmented reality mode, the time required to launch the viewfinder may delay the display of augmented reality content. Therefore, by pre-launching the viewfinder in an instance in which it is determined that there is a likelihood of augmented reality mode being activated, some example embodiments may enable a more rapid activation of augmented reality mode such that an augmented reality display is displayed to a user more rapidly by eliminating wait time for the viewfinder to be launched In an instance in which the viewfinder is pre-launched and augmented reality mode is not subsequently activated, the augmented reality control circuitry 118 may deactivate the viewfinder. For example, if augmented reality mode has not been activated within a predefined period of time subsequent to pre-launch of the viewfinder, the viewfinder may be deactivated. As another example, if usage patterns, context data, and/or the like no longer indicate a likelihood of activation of augmented reality mode, the augmented reality control circuitry 118 may deactivate a pre-launched viewfinder.

FIG. 6 illustrates a flowchart according to an example method for enhancing activation of an augmented reality mode according to an example embodiment. The operations illustrated in and described with respect to FIG. 6 may, for example, be performed by, with the assistance of, and/or under the control of one or more of the processor 110, memory 112, communication interface 114, user interface 116, augmented reality control circuitry 118, camera module 120, or positioning sensor 122. Operation 600 may comprise detecting a predefined trigger for activating an augmented reality mode. The processor 110, memory 112, user interface 116, augmented reality control circuitry 118, camera module 120, or positioning sensor 122 may, for example, provide means for performing operation 600. Operation 610 may comprise determining, responsive to the predefined trigger, at least a portion of content visibly displayed. The processor 110, memory 112, user interface 116, and/or augmented reality control circuitry 118 may, for example, provide means for performing operation 610. Operation 620 may comprise activating the augmented reality mode. Content displayed in the augmented reality mode may be at least partially defined by the content determined in operation 610. The processor 110, memory 112, user interface 116, augmented reality control circuitry 118, camera module 120, and/or positioning sensor 122 may, for example, provide means for performing operation 620.

FIG. 7 illustrates a flowchart according to an example method for enhancing activation of an augmented reality mode according to an example embodiment. The operations illustrated in and described with respect to FIG. 7 may, for example, be performed by, with the assistance of, and/or under the control of one or more of the processor 110, memory 112, communication interface 114, user interface 116, augmented reality control circuitry 118, camera module 120, or positioning sensor 122. Operation 700 may comprise determining that that there is a likelihood of augmented reality mode being activated. The processor 110, memory 112, communication interface 114, user interface 116, augmented reality control circuitry 118, camera module 120, and/or positioning sensor 122 may, for example, provide means for performing operation 700. Operation 710 may comprise pre-launching viewfinder responsive to determining that there is a likelihood of augmented reality mode being activated. The processor 110, memory 112, augmented reality control circuitry 118, and/or camera module 120 may, for example, provide means for performing operation 710.

FIGS. 6-7 each illustrate a flowchart of a system, method, and computer program product according to an example embodiment. It will be understood that each block of the flowcharts, and combinations of blocks in the flowcharts, may be implemented by various means, such as hardware and/or a computer program product comprising one or more computer-readable mediums having computer readable program instructions stored thereon. For example, one or more of the procedures described herein may be embodied by computer program instructions of a computer program product. In this regard, the computer program product(s) which embody the procedures described herein may be stored by one or more memory devices of a mobile terminal, server, or other computing device (for example, in the memory 112) and executed by a processor in the computing device (for example, by the processor 110). In some embodiments, the computer program instructions comprising the computer program product(s) which embody the procedures described above may be stored by memory devices of a plurality of computing devices. As will be appreciated, any such computer program product may be loaded onto a computer or other programmable apparatus (for example, an augmented reality apparatus 102) to produce a machine, such that the computer program product including the instructions which execute on the computer or other programmable apparatus creates means for implementing the functions specified in the flowchart block(s). Further, the computer program product may comprise one or more computer-readable memories on which the computer program instructions may be stored such that the one or more computer-readable memories can direct a computer or other programmable apparatus to function in a particular manner, such that the computer program product comprises an article of manufacture which implements the function specified in the flowchart block(s). The computer program instructions of one or more computer program products may also be loaded onto a computer or other programmable apparatus (for example, an augmented reality apparatus 102) to cause a series of operations to be performed on the computer or other programmable apparatus to produce a computer-implemented process such that the instructions which execute on the computer or other programmable apparatus implement the functions specified in the flowchart block(s).

Accordingly, blocks of the flowcharts support combinations of means for performing the specified functions. It will also be understood that one or more blocks of the flowcharts, and combinations of blocks in the flowcharts, may be implemented by special purpose hardware-based computer systems which perform the specified functions, or combinations of special purpose hardware and computer program product(s).

The above described functions may be carried out in many ways. For example, any suitable means for carrying out each of the functions described above may be employed to carry out embodiments of the invention. In one embodiment, a suitably configured processor (for example, the processor 110) may provide all or a portion of the elements. In another embodiment, all or a portion of the elements may be configured by and operate under control of a computer program product. The computer program product for performing the methods of embodiments of the invention includes a computer-readable storage medium (for example, the memory 112), such as the non-volatile storage medium, and computer-readable program code portions, such as a series of computer instructions, embodied in the computer-readable storage medium.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the invention. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the invention. In this regard, for example, different combinations of elements and/or functions than those explicitly described above are also contemplated within the scope of the invention. Although specific terms are employed herein, they are used in a generic and descriptive sense only and not for purposes of limitation.

What is claimed is:

1. A method comprising:
    detecting a predefined trigger for activating an augmented reality mode;
    receiving an indication of a selected portion of content displayed on an interface, the interface comprising the selected portion of content and an unselected portion of content other than the selected portion of content, wherein the selected portion of content relates to a first application and the unselected portion of content relates to at least one other application;
    determining, responsive to the predefined trigger, the selected portion of content displayed in the interface, wherein determining the selected portion of content visibly displayed comprises determining displayed content with a relevancy value which satisfies a predetermined relevancy threshold based at least in part on a user preference and a user context, wherein the user context includes a non-location-based property of the user, and wherein the user preference is determined based at least in part on user history; and
    activating, by augmented reality control circuitry, the augmented reality mode, wherein content displayed in the augmented reality mode is at least partially defined by the determined selected portion of content, and wherein the augmented reality mode does not display content associated with the unselected portion of content.

2. The method of claim 1, wherein determining the selected portion of content displayed comprises determining one or more content items displayed in a selected portion of a graphical user interface or content displayed within a predefined portion of a display.

3. The method of claim 1, further comprising, determining, responsive to the predefined trigger, whether map content is visibly displayed; and wherein activating the augmented reality mode comprises activating the augmented reality mode only in an instance in which it is determined that map content is visibly displayed.

4. The method of claim 1, wherein activating the augmented reality mode comprises:
transitioning from a two-dimensional display view in which the determined selected portion of content is displayed to a three-dimensional display view; and
transitioning from the three-dimensional view to an augmented reality display view.

5. The method of claim 4, further comprising detecting a second predefined trigger, and wherein transitioning from the three-dimensional display view to the augmented reality display view comprises transitioning from the three-dimensional display view to the augmented reality display view responsive to the second predefined trigger.

6. The method of claim 4, wherein transitioning from the two-dimensional display view to the three-dimensional display view comprises causing a transition from display of two-dimensional map content to display of three-dimensional map content.

7. The method of claim 1, further comprising:
determining, prior to detecting the predefined trigger, based at least in part on context data regarding an augmented reality apparatus that there is a likelihood of the augmented reality mode being activated; and
responsive to determining that there is a likelihood of the augmented reality mode being activated, pre-launching a viewfinder, thereby enabling more rapid activation of the augmented reality mode when the augmented reality mode is activated.

8. The method of claim 1, wherein the first application comprises a social networking service and the at least one other application comprises contact information.

9. The method of claim 8, wherein the content displayed in the augmented reality mode comprises an augmented reality view including features of the first application.

10. The method of claim 1, wherein the content displayed on the interface comprises a plurality of containers, wherein each container relates to a different type of content associated with a different application, and wherein the selected portion of content relates to a first container associated with the first application, and the unselected portion of content relates to at least one other container related to a respective at least one other application.

11. An apparatus comprising at least one processor and at least one memory storing computer program code, wherein the at least one memory and stored computer program code are configured, with the at least one processor, to cause the apparatus to at least:
detect a predefined trigger for activating an augmented reality mode;
receive an indication of a selected portion of content displayed on an interface, the interface comprising the selected portion of content and an unselected portion of content other than the selected portion of content, wherein the selected portion of content relates to a first application and the unselected portion of content relates to at least one other application;
determine, responsive to the predefined trigger, the selected portion of content displayed in the interface, wherein determining the selected portion of content visibly displayed comprises determining displayed content with a relevancy value which satisfies a predetermined relevancy threshold based at least in part on a user preference and a user context, wherein the user context includes a non-location-based property of the user, and wherein the user preference is determined based at least in part on user history; and
activate the augmented reality mode, wherein content displayed in the augmented reality mode is at least partially defined by the determined selected portion of content, and wherein the augmented reality mode does not display content associated with the unselected portion of content.

12. The apparatus of claim 11, wherein the at least one memory and stored computer program code are configured, with the at least one processor, to cause the apparatus to detect the predefined trigger by detecting movement of the apparatus along a predefined trajectory of motion.

13. The apparatus of claim 11, wherein the at least one memory and stored computer program code are configured, with the at least one processor, to cause the apparatus to determine the selected portion of content displayed at least in part by determining one or more of content displayed in a selected portion of a graphical user interface or content displayed within a predefined portion of a display.

14. The apparatus of claim 11, wherein the at least one memory and stored computer program code are configured, with the at least one processor, to further cause the apparatus to:
determine, responsive to the predefined trigger, whether map content is visibly displayed; and
activate the augmented reality mode only in an instance in which it is determined that map content is visibly displayed.

15. The apparatus of claim 11, wherein the at least one memory and stored computer program code are configured, with the at least one processor, to further cause the apparatus to activate the augmented reality mode at least in part by:
transitioning from a two-dimensional display view in which the determined content is displayed to a three-dimensional display view; and
transitioning from the three-dimensional view to an augmented reality display view.

16. The apparatus of claim 15, wherein the at least one memory and stored computer program code are configured, with the at least one processor, to further cause the apparatus to:
detect a second predefined trigger; and
transition from the three-dimensional display view to the augmented reality display view responsive to the second predefined trigger.

17. The apparatus of claim 11, wherein the at least one memory and stored computer program code are configured, with the at least one processor, to further cause the apparatus to:
determine, prior to detecting the predefined trigger, based at least in part on context data regarding the apparatus that there is a likelihood of the augmented reality mode being activated; and
responsive to determining that there is a likelihood of the augmented reality mode being activated, pre-launch a viewfinder, thereby enabling more rapid activation of the augmented reality mode when the augmented reality mode is activated.

18. The apparatus according to claim 11, wherein the apparatus comprises or is embodied on a mobile phone, the mobile phone comprising user interface circuitry and user interface software stored on one or more of the at least one memory; wherein the user interface circuitry and user interface software are configured to:

facilitate user control of at least some functions of the mobile phone through use of a display; and cause at least a portion of a user interface of the mobile phone to be displayed on the display to facilitate user control of at least some functions of the mobile phone.

19. A computer program product comprising at least one non-transitory computer-readable storage medium having computer-readable program instructions stored therein, the computer-readable program instructions comprising:

program instructions configured to detect a predefined trigger for activating an augmented reality mode;

program instructions configured to receive an indication of a selected portion of content displayed on an interface, the interface comprising the selected portion of content and an unselected portion of content other than the selected portion of content, wherein the selected portion of content relates to a first application and the unselected portion of content relates to at least one other application;

program instructions configured to determine, responsive to the predefined trigger, the selected portion of content displayed in the interface, wherein determining the selected portion of content visibly displayed comprises determining displayed content with a relevancy value which satisfies a predetermined relevancy threshold based at least in part on a user preference and a user context, wherein the user context includes a non-location-based property of the user, and wherein the user preference is determined based at least in part on user history; and program instructions configured to activate the augmented reality mode, wherein content displayed in the augmented reality mode is at least partially defined by the determined selected portion of content, and wherein the augmented reality mode does not display content associated with the unselected portion of content.

20. The computer program product according to claim 19, further comprising:

program instructions configured to determine, responsive to the predefined trigger, whether map content is visibly displayed; and wherein the program instructions configured to activate the augmented reality mode comprise program instructions configured to activate the augmented reality mode only in an instance in which it is determined that map content is visibly displayed.

* * * * *